US011908436B2

(12) United States Patent
Goold

(10) Patent No.: US 11,908,436 B2
(45) Date of Patent: Feb. 20, 2024

(54) ERGONOMIC INSTRUMENT PICK

(71) Applicant: Kevin Randall Goold, Fort Worth, TX (US)

(72) Inventor: Kevin Randall Goold, Fort Worth, TX (US)

( * ) Notice: Subject to any disclaimer, the term of this patent is extended or adjusted under 35 U.S.C. 154(b) by 0 days.

(21) Appl. No.: 17/937,249

(22) Filed: Sep. 30, 2022

(65) Prior Publication Data

US 2023/0100336 A1 Mar. 30, 2023

Related U.S. Application Data

(60) Provisional application No. 63/250,801, filed on Sep. 30, 2021.

(51) Int. Cl.
*G10D 3/00* (2020.01)
*G10D 3/173* (2020.01)

(52) U.S. Cl.
CPC .................................... *G10D 3/173* (2020.02)

(58) Field of Classification Search
CPC ............ G10D 3/173; G10D 1/08; G10D 3/00; G10D 1/00
See application file for complete search history.

(56) References Cited

U.S. PATENT DOCUMENTS 5,323,677 A 6/1994 Knutson
5,981,857 A 11/1999 Mapson
6,335,477 B1 1/2002 Miller
6,797,871 B2 9/2004 Atkin
7,812,234 B2 10/2010 Dybas
8,378,193 B2 2/2013 Culver et al.
9,263,007 B2 2/2016 Goble
9,330,640 B2 5/2016 Tsukada
9,666,169 B2 5/2017 West et al.
9,899,010 B2 2/2018 Dutton
10,192,531 B1 1/2019 Cobb
10,283,862 B2 5/2019 Klemes
10,319,349 B2 6/2019 Culver et al.
10,600,392 B2 3/2020 Holcomb
10,818,273 B1 10/2020 Richard
2011/0283862 A1 11/2011 Tracy
2015/0310839 A1* 10/2015 Snyder .................. G10D 3/173
84/322

* cited by examiner

*Primary Examiner* — Kimberly R Lockett
(74) *Attorney, Agent, or Firm* — Dunlap Bennett & Ludwig, PLLC; Anna L. Kinney

(57) ABSTRACT

An instrument pick has a triangular planar body; a concave thumb platform; and an index finger slot. The body has rounded vertices, including a plucking vertex. The thumb platform has concentric grooves and a thumb cavity sidewall extending between the thumb platform and the body to form a drainage cavity. The thumb platform sidewall has an opening that connects to the drainage cavity. The finger slot has a base flanked by a pair of curved side walls. The side walls taper together to form a ridge that resist the user's index finger from sliding towards the plucking vertex. The finger slot has ventilation openings that connect to the drainage cavity to collect perspiration. The pick stays in place between thumb and finger even with a loose grip and can be customized for different playing styles.

7 Claims, 4 Drawing Sheets

ERGONOMIC INSTRUMENT PICK

CROSS-REFERENCE TO RELATED APPLICATION

This application claims the benefit of priority of U.S. provisional application No. 63/250,801, filed Sep. 30, 2021, the contents of which are herein incorporated by reference.

BACKGROUND OF THE INVENTION

The present invention relates to string instrument accessories and, more particularly, to an ergonomic instrument pick.

While strumming or picking strings on an instrument, a pick tends to rotate in the fingers or slip out entirely. Surface textures do not sufficiently aid in preventing a pick from shifting in one's fingers because with most actions of the pick, it bounces and/or lifts off the finger and resettles in a new position.

Currently available picks with "grip aides" merely provide a texture on the flat surface. Even if the surface of the pick can be made to be less slippery, the bouncing nature of the action requires the user to grip as tight as possible to keep the pick in position.

As can be seen, there is a need for a pick that does not move in one's hand while playing an instrument.

SUMMARY OF THE INVENTION

In one aspect of the present invention, an instrument pick comprises a substantially triangular planar body with rounded vertices including a plucking vertex; a concave thumb platform with concentric grooves formed therein, spaced from a first surface of the substantially triangular planar body by a sidewall extending therebetween to form a drainage cavity; the sidewall having a first aperture therethrough fluidly communicating with the drainage cavity; and an index finger slot having a base on a second surface of the substantially triangular planar body opposite the concave thumb platform, flanked by a pair of curved side walls with ventilation apertures formed therein; the side walls tapering together to form a ridge on the base proximal to the plucking vertex.

The thumb platform may be angled to allow for a looser grip while maintaining surface contact. Some versions of the pick offer various angles of the picking surface in relation to the index finger which may be selected to accommodate different playing styles, striking the strings at a preferential angle. The barriers on either side of the index finger, even as the pick bounces, retracts it back into the original position.

These and other features, aspects and advantages of the present invention will become better understood with reference to the following drawings, description, and claims.

DETAILED DESCRIPTION OF THE INVENTION

Figure 1:
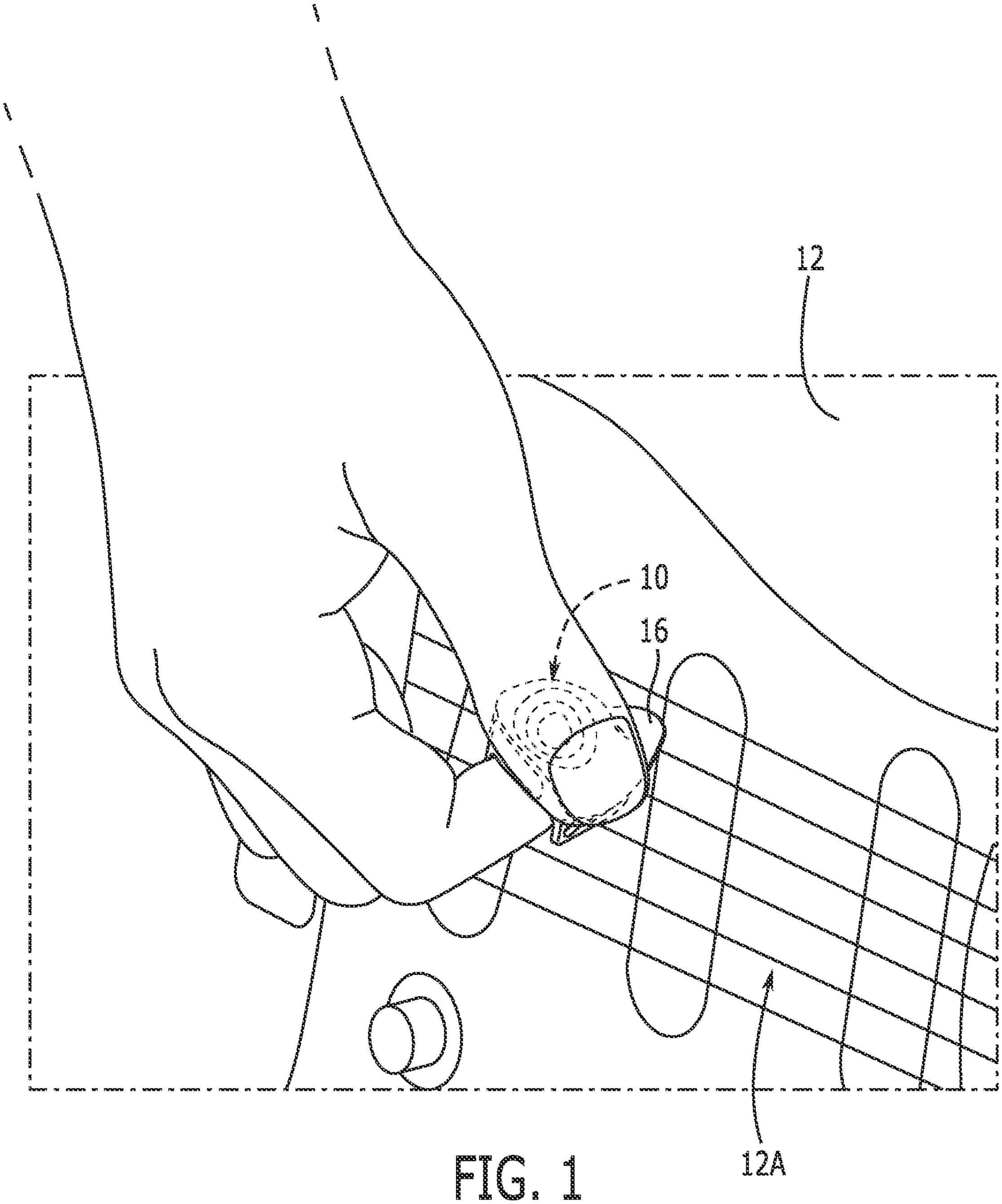
FIG. 1 is a front perspective view of an instrumental pick according to an embodiment of the present invention, shown in use.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is an instrumental pick having a concave thumb platform and an index finger slot with vertical tapered walls configured to abut the sides and tip of the user's index finger.

The thumb platform may be spaced from the pick body by a sidewall extending between the platform and the pick body, forming a drainage cavity. The drainage cavity may drain through a small aperture in the thumb platform sidewall. A portion of the pick between the thumb platform and the pick body facing the user's hand may be open to ambient air. An opposite edge of the thumb platform may curve down to join the pick body. Grooves in the thumb platform may allow perspiration to drain into the drainage cavity. The platform may have a suitable number of grooves, for example 1 to about 10 grooves. The grooves may be concentric.

Curved vertical walls flanking either side of the index finger slot keep the pick from losing position in the fingers while playing. The vertical walls may be custom fit to a player's finger width. Each sidewall may have one or more ventilation apertures, such as about 1 to about 5. The base may have ventilation apertures fluidly communicating with the drainage cavity, e.g., about 1 to about 10 openings.

The angles on the thumb and/or index finger in relation to the pick surface may be selected for comfort or for effect. The thumb platform lies on a plane having a predetermined tilt angle compared to the plane of the pick body. The index finger slot base generally lies on the plane of the pick body. For example, the thumb platform may have an angle of about 25° to the plane of the triangular pick body while the index finger slot may each have an angle of about 0°. Alternatively, the thumb platform may have an angle of about 0° compared to the pick body while the index finger slot may have an angle of about 20°. The angle at which the pick strikes the string may thus be optimized, enabling the person to choose a pick embodiment to accommodate a flat striking style (for a crisp sound, easier for the picking of strings) or a more angled, grazing style (for a softer sound, easier for the strumming of strings).

The thumb platform and the index finger slot each have a longitudinal axis. The longitudinal axis of the index finger slot is generally the same as a central axis passing through the plucking or pick vertex and the midpoint of an opposite edge. Each axis may have a predetermined angle with respect to one or both remaining axes. For example, the thumb platform longitudinal axis and the index finger slot axis may be rotated about 20° to about 60° with respect to each other.

To use the inventive pick, a person may hold the pick with the index finger positioned between the two walls and play a stringed instrument in a manner well known in the art. The pick stays in position with less effort than the grip needed to use a prior art pick.

The pick may be designed with 3D CAD software and may be 3D printed or injection molded. The pick may be formed as a single unitary article or as components that are assembled. The materials of manufacture are not particularly limited. For example, the pick may be made of any suitable thermoplastic.

Referring to FIGS. 1 through 7, FIG. 1 illustrates an instrumental pick according to an embodiment of the present invention, shown in phantom between the user's thumb and index finger. The pick 10 has a substantially triangular planar body tapering to rounded vertices including a plucking vertex 16. The body has a central axis extending through the plucking vertex and passing through a midpoint of the opposite edge. The pick 10 is shown in a position to strum strings 12A of a guitar 12.

Figure 2:
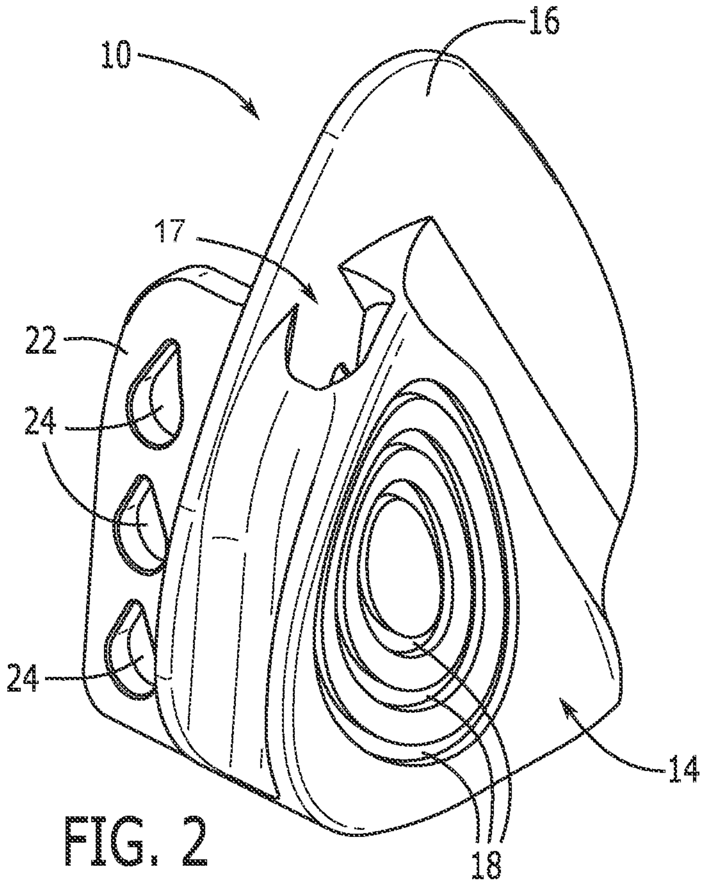
FIG. 2 is another front perspective view thereof.
Figure 3:
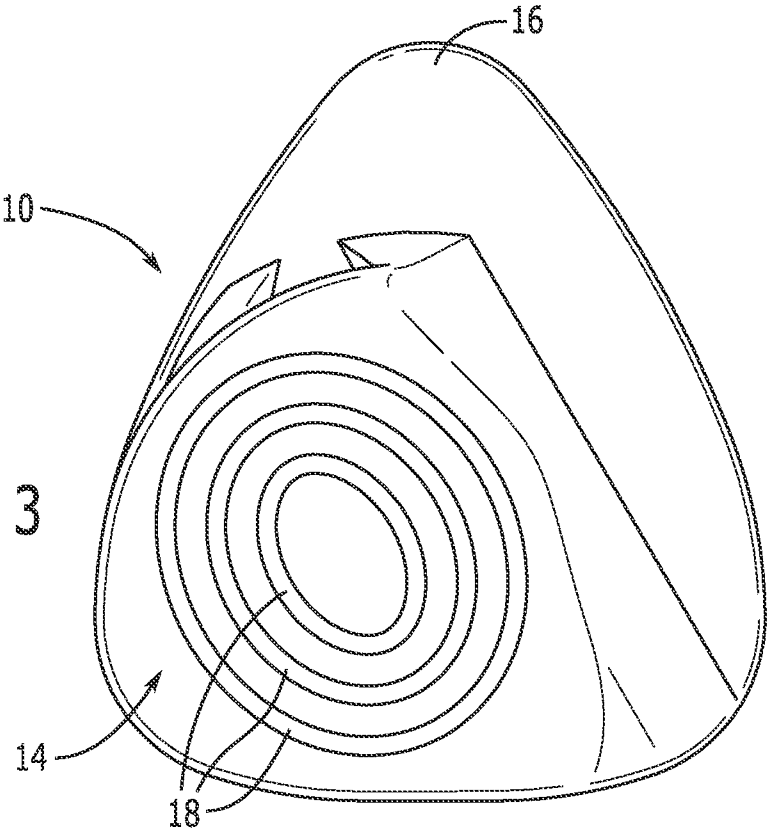
FIG. 3 is another front perspective view thereof.

As shown in FIGS. 2 and 3, the pick 10 has a concave thumb platform 14 that conforms to the shape of a thumb on one surface thereof. The platform 14 is oriented on a plane and a longitudinal axis effective to guide the user's thumb such that the user holds the pick in a comfortable and effective position, e.g., with the tip of the thumb pointing toward a side adjacent to the plucking end 16. The thumb platform plane is on a predetermined tilt angle from the plane of the pick body and from an index finger slot 20; see FIG. 4. The longitudinal axis has a predetermined rotational angle relative to the longitudinal axis of the index finger slot 20, discussed below. The thumb platform 14 has anti-slip concentric grooves 18. The platform 14 is slightly raised from the body of the pick 10 to form a drainage cavity 17 and has a sidewall forming an aperture through which perspiration may drain from the cavity 17.

Figure 4:
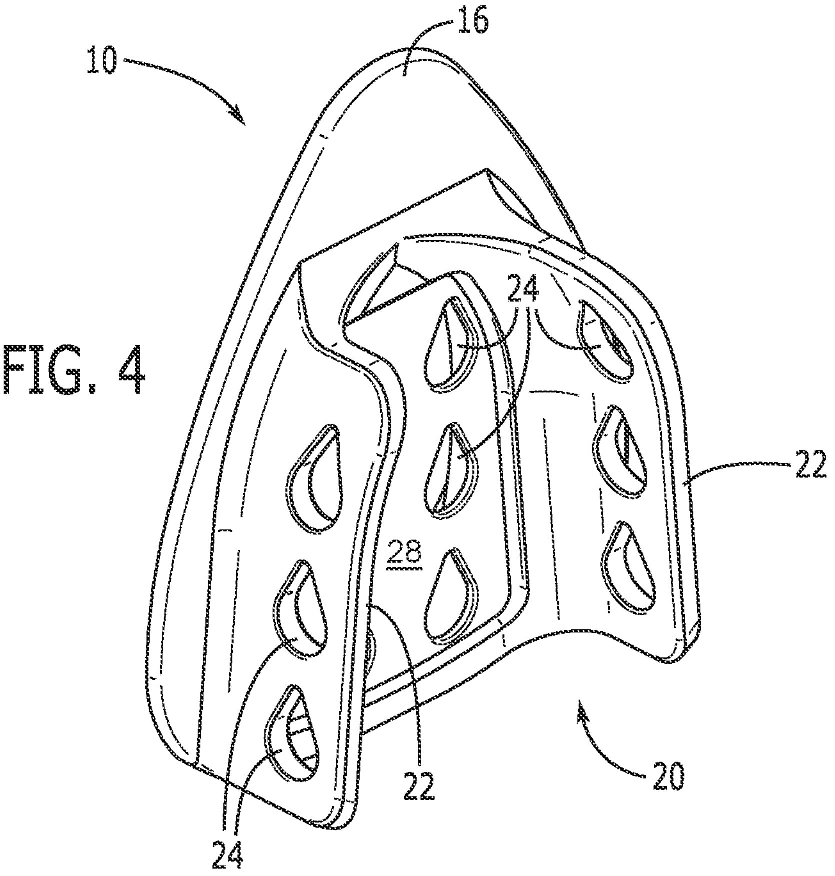
FIG. 4 is a rear perspective view thereof.
Figure 5:
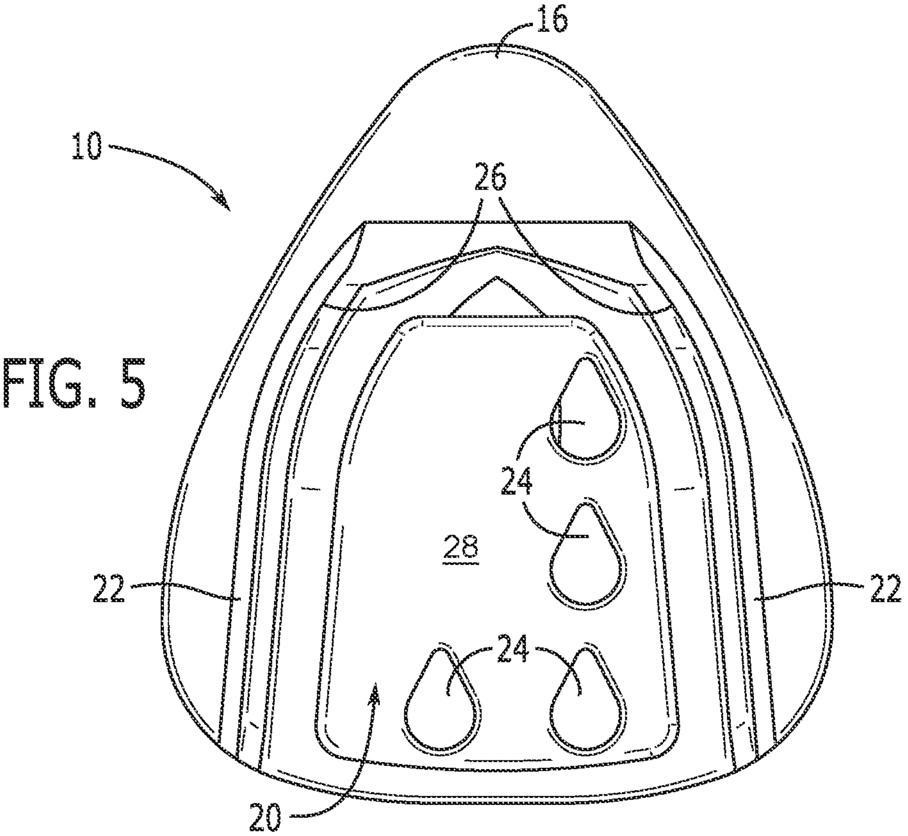
FIG. 5 is a rear elevation view thereof.

FIGS. 4 and 5 illustrate an index finger slot 20 on the pick body surface opposite the thumb platform 14. A pair of curved side walls 22 flank a base or surface 28 on which the index finger rests. The sidewalls are oriented to guide the user's index finger along a longitudinal axis and the base is oriented on a plane and a longitudinal axis effective to guide the user to hold the pick in a comfortable and effective position, e.g., the tip of the index finger points toward the plucking end. The base 28 is on a predetermined tilt angle from the thumb platform 14. The longitudinal axis has a predetermined rotational angle relative to the longitudinal axis of the thumb platform 14. The side walls 22 and the surface 28 have ventilation apertures or openings 24, allowing perspiration to drain into a drainage cavity formed between the pick body and the thumb platform 14. The side walls 22 touch the sides of the user's finger when in use position. The side walls 22 taper downward and together proximal to the plucking tip 16 to curved ends 26 forming a ridge that prevents the tip of the index finger from sliding forward.

Figure 6:
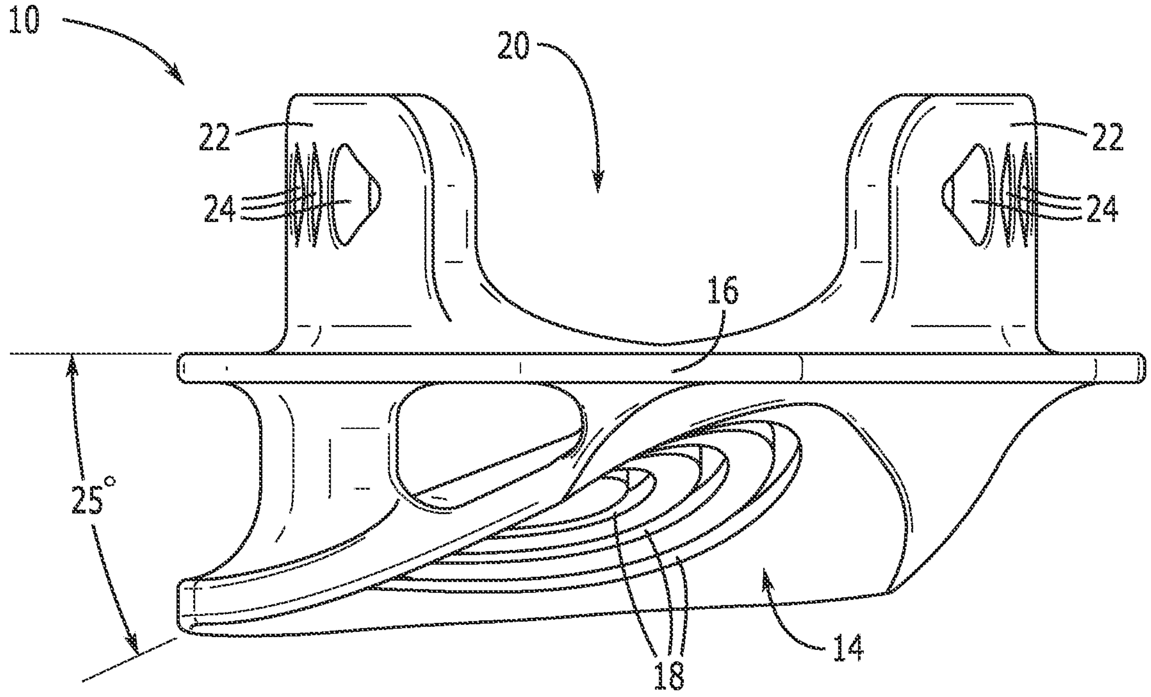
FIG. 6 is a side elevation view thereof.
Figure 7:
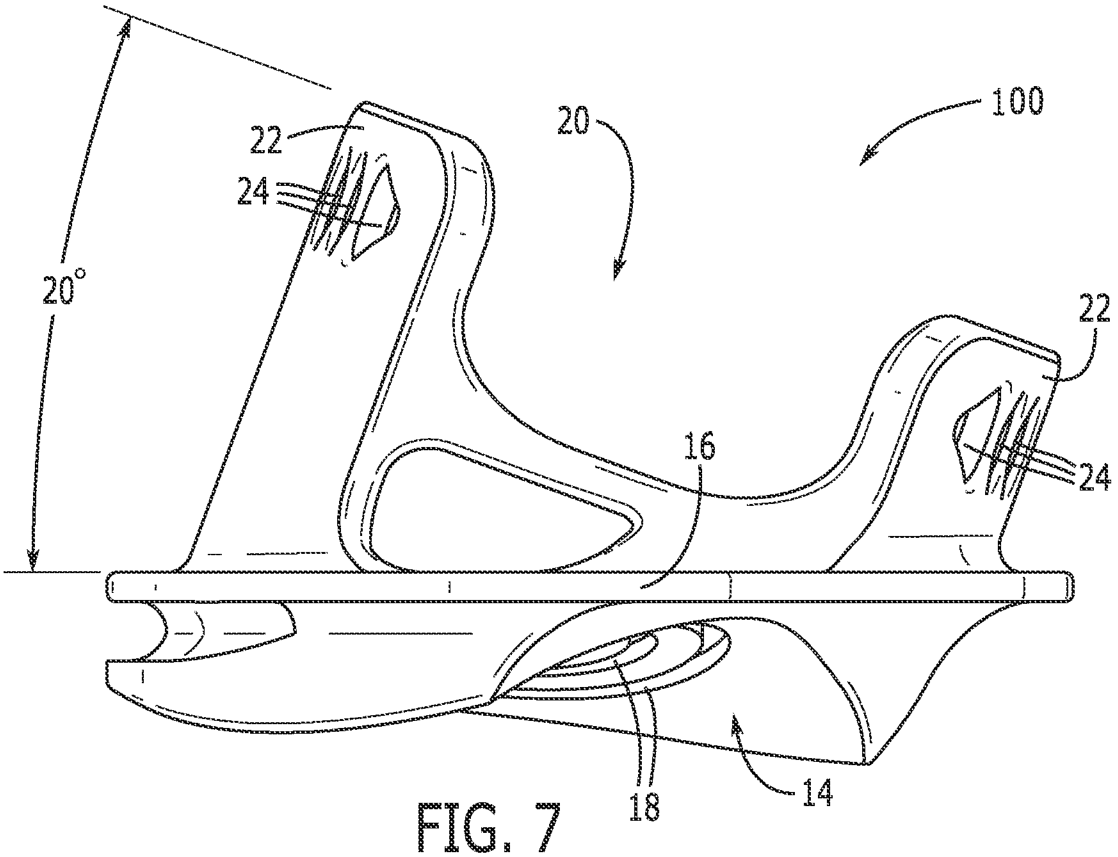
FIG. 7 is a side elevation view of an instrumental pick according to another embodiment of the present invention.

An alternate embodiment of the instrumental pick 100 is illustrated in FIG. 7. As shown in FIG. 6, the thumb platform 14 may be formed at an angle from the index finger slot 20 surface. In this case, the thumb platform 14 is on a plane positioned at an angle of 25° to the pick body 16 plane. FIG. 7 shows a pick 100 with an index finger slot 20 formed at an angle from the pick body 16 plane. In this case, one side wall 22 is lengthened, and the second side wall 22 is angled to be parallel with the first side wall 22, such that the tops of the side walls form a plane tilted at a 20° angle from the pick body.

Examples

A first pick has a pick edge parallel (i.e., at 0°) with the index finger so that the pick edge strikes a guitar string at an angle. A second pick has pick edge at a angle to the index finger so that the pick edge strikes a guitar string flat, closer to a 0° angle.

It should be understood, of course, that the foregoing relates to exemplary embodiments of the invention and that modifications may be made without departing from the spirit and scope of the invention as set forth in the following claims.

What is claimed is:

1. An instrument pick comprising:

a substantially triangular planar body with rounded vertices including a plucking vertex;

a concave thumb platform with concentric grooves formed therein, spaced from a first surface of the substantially triangular planar body by a sidewall extending therebetween to form a drainage cavity; the sidewall having a first aperture therethrough fluidly communicating with the drainage cavity; and an index finger slot having a base on a second surface of the substantially triangular planar body opposite the concave thumb platform, flanked by a pair of curved side walls with ventilation apertures formed therein; the side walls tapering together to form a ridge on the base proximal to the plucking vertex.

2. The instrument pick of claim 1, wherein the concave thumb platform has from 1 to 10 concentric grooves.

3. The instrument pick of claim 1, wherein the side walls and/or the base have from 1 to about 20 apertures.

4. The instrument pick of claim 1, wherein the substantially triangular planar body, the concave thumb platform, and the index finger slot are a single unitary article.

5. The instrument pick of claim 1, wherein the concave thumb platform is formed on a plane at a predetermined angle from the substantially triangular planar body.

6. The instrument pick of claim 5, wherein the predetermined angle is 0 to about 45°.

7. The instrument pick of claim 6, wherein the predetermined angle is from 25° to 35°.

* * * * *